(12) United States Patent
Johnson et al.

(10) Patent No.: US 6,518,882 B2
(45) Date of Patent: Feb. 11, 2003

(54) KEY FOB WITH VALET AND CAR LOCATOR FEATURE

(75) Inventors: Susan Johnson, Rochester, MI (US); Tejas Desai, Sterling Heights, MI (US); Deborah Marie Lambert, San Francisco, CA (US); Jonathan Clark, Provo, UT (US); Jeralyn Reese, Pasadena, CA (US)

(73) Assignee: Siemens VDO Automotive Corporation, Auburns Hills, MI (US)

(*) Notice: Subject to any disclaimer, the term of this patent is extended or adjusted under 35 U.S.C. 154(b) by 0 days.

(21) Appl. No.: 09/962,061

(22) Filed: Sep. 25, 2001

(65) Prior Publication Data

US 2002/0067249 A1 Jun. 6, 2002

Related U.S. Application Data

(62) Division of application No. 09/586,450, filed on Jun. 2, 2000
(60) Provisional application No. 60/139,237, filed on Jun. 14, 1999.

(51) Int. Cl.[7] .................................................. G08B 1/08
(52) U.S. Cl. ....................... 340/539; 340/507; 340/426; 340/425.5
(58) Field of Search ........................... 342/357.07, 456, 342/457, 450; 701/23, 25, 29, 200, 209, 207, 213; 340/507, 426, 539, 574, 425.5

(56) References Cited

U.S. PATENT DOCUMENTS

| | | | |
|---|---|---|---|
| 4,562,712 A | | 1/1986 | Wolter ....................... 70/456 R |
| 4,673,921 A | | 6/1987 | Saito et al. .................. 340/539 |
| 5,786,758 A | * | 7/1998 | Bullock ....................... 340/539 |
| 6,271,745 B1 | * | 8/2001 | Anzai et al. ................ 340/5.53 |
| 6,386,007 B1 | * | 5/2002 | Johnson et al. ............... 70/408 |
| 6,392,592 B1 | * | 5/2002 | Johnson et al. ........ 342/357.07 |

FOREIGN PATENT DOCUMENTS

| | | |
|---|---|---|
| DE | 4444913 | 6/1995 |
| EP | 0833026 | 9/1997 |
| FR | 2629934 | 4/1988 |
| GB | 2319803 | 6/1998 |

OTHER PUBLICATIONS

International Search Report dated Dec. 8, 2000.

* cited by examiner

Primary Examiner—Daryl Pope

(57) ABSTRACT

An improved key fob and key combination allows the mechanical key to be removed from the key fob and given to a valet attendant. The key is provided with a mechanical latch which may be easily removed from the key fob. When the key is removed, secured areas on the vehicle are locked. Moreover, the vehicle has limited operation when the mechanical key is not received with the key fob. In a second feature of this invention, a locator function on the key fob provides an indication of an approximate direction to a vehicle in a parking area. The key fob relies upon RF transmissions from the vehicle to determine an approximate direction to the vehicle.

10 Claims, 3 Drawing Sheets

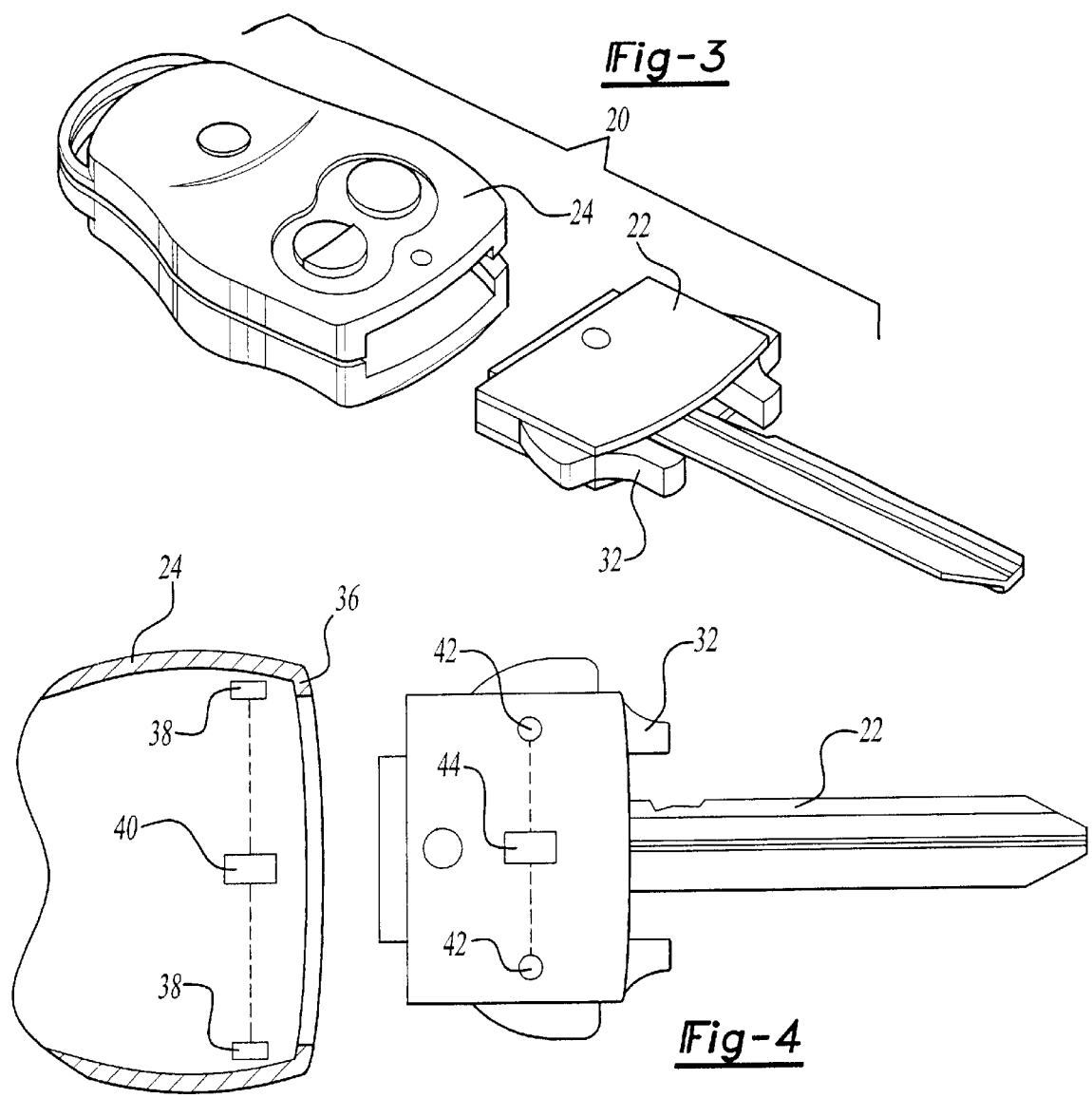

KEY FOB WITH VALET AND CAR LOCATOR FEATURE

This application is a division of Ser. No. 09/586,450 Jun. 2, 2000 which claims benefit of No. 60/139,237 Jun. 14, 1999.

BACKGROUND OF THE INVENTION

This application relates to a vehicle key fob having a detachable key for use by a valet parking attendant. Further, this invention relates to a key fob which assists an operator in locating a vehicle when parked.

Modern vehicles are typically provided with a key fob providing a number of electronic control functions. Typical key fob functions include door lock/unlock, trunk lock/unlock, and various other security controls. As more and more controls are incorporated into a vehicle key fob, certain common uses of a vehicle key become problematic. As one example, when parking at a restaurant, etc., an operator often chooses to allow a parking valet to utilize the key to park the vehicle. If the valet is allowed to have complete use of all of the key fob functions, then security of the vehicle might be compromised.

Various attempts have been made to limit the number of controls available to a valet. However, each of these attempts have been unduly complex. It would be desirable to provide a simple key and key fob combination wherein the valet is allowed use of the key for driving and parking a vehicle, but not allowed access to all of the security functions on the key fob.

One other problem with modern vehicles is locating the vehicle in large parking areas. Often, an operator will spend a good deal of time attempting to locate a vehicle in a large parking lot. One known way of locating a vehicle uses a key fob. The user presses the lock button on the key fob. The lock button actuates a sound, provided the key fob is within a predetermined distance of the vehicle. When the sound is made, the operator can look in the direction of the sound and hopefully find the vehicle. However, this method does require the operator to be within a short distance of the vehicle, and thus does not address the problem of finding a vehicle in a very large parking area.

SUMMARY OF THE INVENTION

In one feature of this invention, a key is held in its key fob by a retention feature, and specifically latches. The key easily and quickly snaps into the key fob, and is easily removed by actuation of the latches. Thus, the operator can remove the key from the key fob, and can provide the key to the valet parking attendant.

Moreover, the key by itself preferably has fewer controls for security applications than does the key fob. As an example, while the key fob may have door unlock/lock functions and trunk lock/unlock functions, the key may be solely a mechanical key which can be utilized for mechanically opening a door and then starting the vehicle, but which has no control function. Alternatively, the key may have a single button for locking/unlocking the doors, but does not provide access to the trunk.

In a preferred feature of this invention, the key fob is provided with a sensor which senses when the key has been removed. When the key is removed, the sensor sends a signal to a control, and the control preferably moves the vehicle into a "valet" mode. In the valet mode, the trunk is preferably locked, and preferably not allowed to open from the mechanical key. Similarly, the glove compartment is locked and not allowed to open by the mechanical key. Thus, the valet is not allowed access to secured areas in the vehicle. Further, other controls such as limiting the RPMs on the engine may also be actuated by the key fob when the key has been removed.

In a further separate feature of this invention, the combined key and key fob have a vehicle locator function. The key fob is provided with both a transmitter and receiver, as is commonly known. The transmitter transmits a signal to the vehicle, and a vehicle will send back an answering signal for identification purposes. The vehicle based receivers can make an estimate of distance based upon the strength of the signal received from the key fob.

In a disclosed embodiment of this invention, a receiver on a vehicle receives a signal from a key fob, and makes a determination of whether the particular key is inside or outside of a predetermined distance. If the particular key is close to the vehicle and inside the predetermined distance then the receiver on the vehicle interprets the signal to be a control signal from the key. As an example, the key fob may have its door unlock key actuated, and if it is within a predetermined distance, then the control will unlock the vehicle doors. However, if the signal is outside of the distance, then the vehicle receiver will interpret the signal as being a car locator request. In car locator mode, the vehicle sends a signal back to the key fob which will provide the key fob with an indication of the approximate direction to the vehicle.

In one preferred method, the key fob is swept through an angular range while holding a button, such as the door unlock button actuated. The signal from the key fob is received by the vehicle for which the operator is searching. The vehicle receiver determines that the signal is from a key fob outside the predetermined distance, and thus determines that the key fob is in a "locator" mode. A signal is sent back to the key fob. As the key fob is swept through the angular range, a receiver on the key fob receives the signal from the vehicle. The signal received at the fob will be of varying strength as the key fob receiver is pointed away from and directly toward the vehicle. After a first sweep through the range is complete, the key is returned through the same range. The control has previously stored the approximate peak signal value from the vehicle received by the key fob. On the second sweep back, when this same peak signal is approached, a signal on the key fob is actuated to allow the operator to identify the approximate direction of the vehicle. Alternatively, once the key fob and vehicle are in the locator mode, the vehicle can sense the strength of the signal as the key fobs moves through the sweep. The vehicle can then identify a peak, and when that peak is again sensed, send a directional signal to the key fob. When the key fob receives the signal, it can then actuate the locator device. The signal can be light, sound, vibration, etc.

These and other features of the present invention can be best understood from the following specification and drawings, the following of which is a brief description.

BRIEF DESCRIPTION OF THE DRAWINGS

FIG. 3 shows the separate key fob and key.

FIG. 4 shows a key fob and removed key.

FIG. 5 is a table showing the function of the components of the present invention.

DETAILED DESCRIPTION OF A PREFERRED EMBODIMENT

Figure 1:
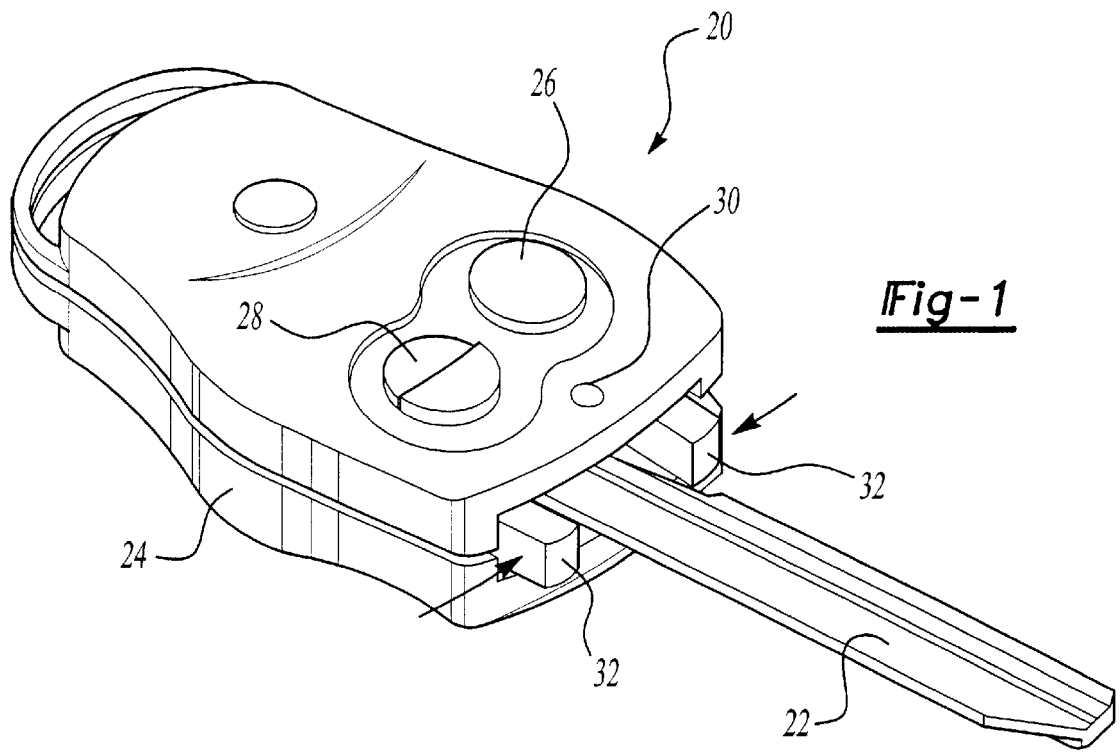
FIG. 1 is a view of a key fob combination according to the present invention.

A key fob and key combination 20 is illustrated in FIG. 1 having a mechanical key portion 22 in a fob portion 24. As known, fob portion 24 incorporates buttons 26 and 28 which perform functions such as door lock/unlock and trunk lock/unlock. Further, a light 30 is incorporated into the key fob 24 to provide a locator function which will be described below. Alternatively, the signal can be vibration, sound, etc. The mechanical key 22 is provided with a pair of spring biased latches 32 which hold the mechanical key portion 22 within the fob 24.

Figure 2:
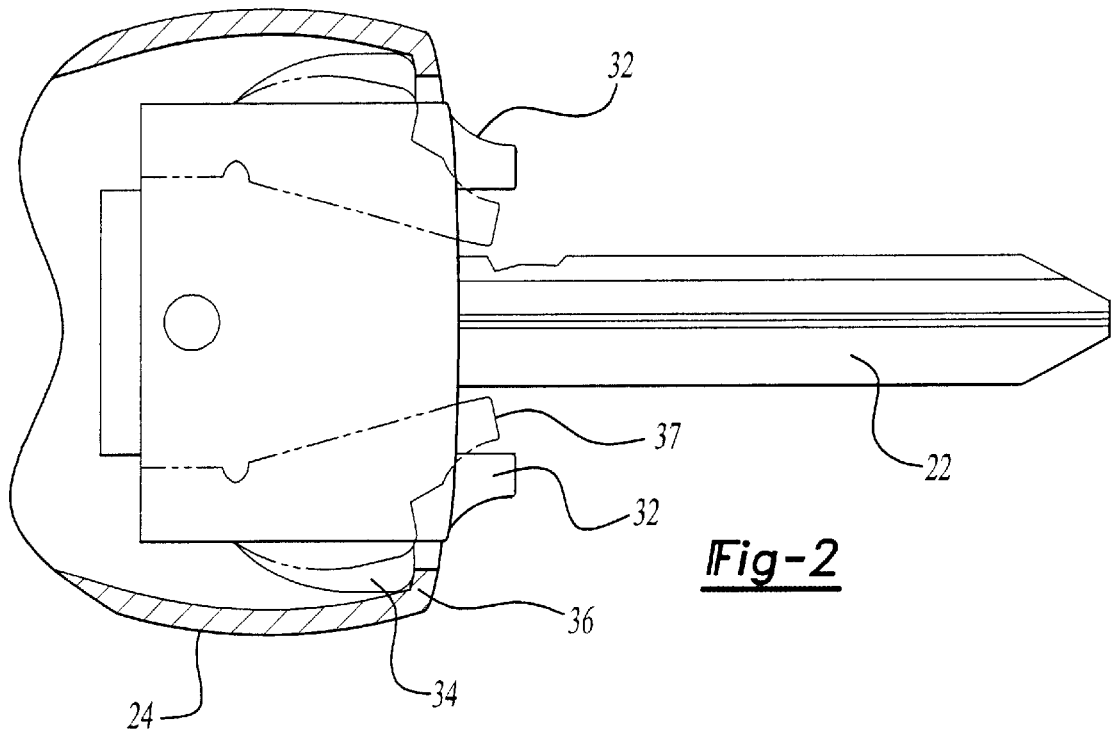
FIG. 2 is a cross-sectional view.

As shown in FIG. 2, a portion 34 of the latches 32 is received within a ledge 36 of the fob 24. Portions 34 thus locks the mechanical key 22 within the fob 24. Latches can be flexed to a position 37 where they allow removal of the key. Although a particular mechanical latch arrangement is illustrated, it should be understood that other simply removable mechanical locks can be utilized to hold the mechanical key within the key fob portion.

As shown in FIG. 3, when the operator is delivering his vehicle to a valet, then the latches 32 are simply moved to remove the mechanical key portion 22 from the fob 24. As is clear, key 22 can be given to the valet with the operator retaining fob 24.

As shown schematically in FIG. 4, sensors 38 are associated with the areas of the ledges 36 in the fob 24, and can sense when the mechanical key 22 has been removed. Sensors 38 communicate with a control 40 to provide an indication that the mechanical key 22 has been removed, and that the key fob 20 is in valet mode.

Similar sensors 42 are shown associated with the latches 32 and communicate with a switch 44. It should be understood that while this invention does disclose a switch 44 on the mechanical key 22, the invention can also be utilized with pure mechanical key 22 that will only provide mechanical functions to the valet.

When the sensors 38 indicate to the control 40 that the mechanical key 22 has been removed, then the key fob 24 is actuated to provide additional security at the vehicle, and to limit access to certain areas in the vehicle for the valet. As an example, the trunk and glove compartment may be automatically locked. The locks are preferably made such that they cannot be overridden by the mechanical key 22. Moreover, other controls such as a engine limit on RPM may be actuated by the control 40. The controls necessary to achieve the above are within the skill of a worker in this art. It is the application of such controls to this system which is inventive here.

The switch 44 may be utilized to lock and unlock the doors of the vehicle. Further, it may be that the sensors 42 will communicate with the control 44 and the switch, such that when the mechanical key 22 is used by the valet to start the vehicle, the above limit on RPM will be set by the key. Further, other types of controls such as a limited number of starts without the key 22 being reinserted into the fob 24 may also be incorporated into the key only function. Various of these features are illustrated in the FIG. 5 table.

Thus, the removable key serves to provide additional security to a vehicle when the vehicle has been delivered to a valet parking attendant.

Figure 6:
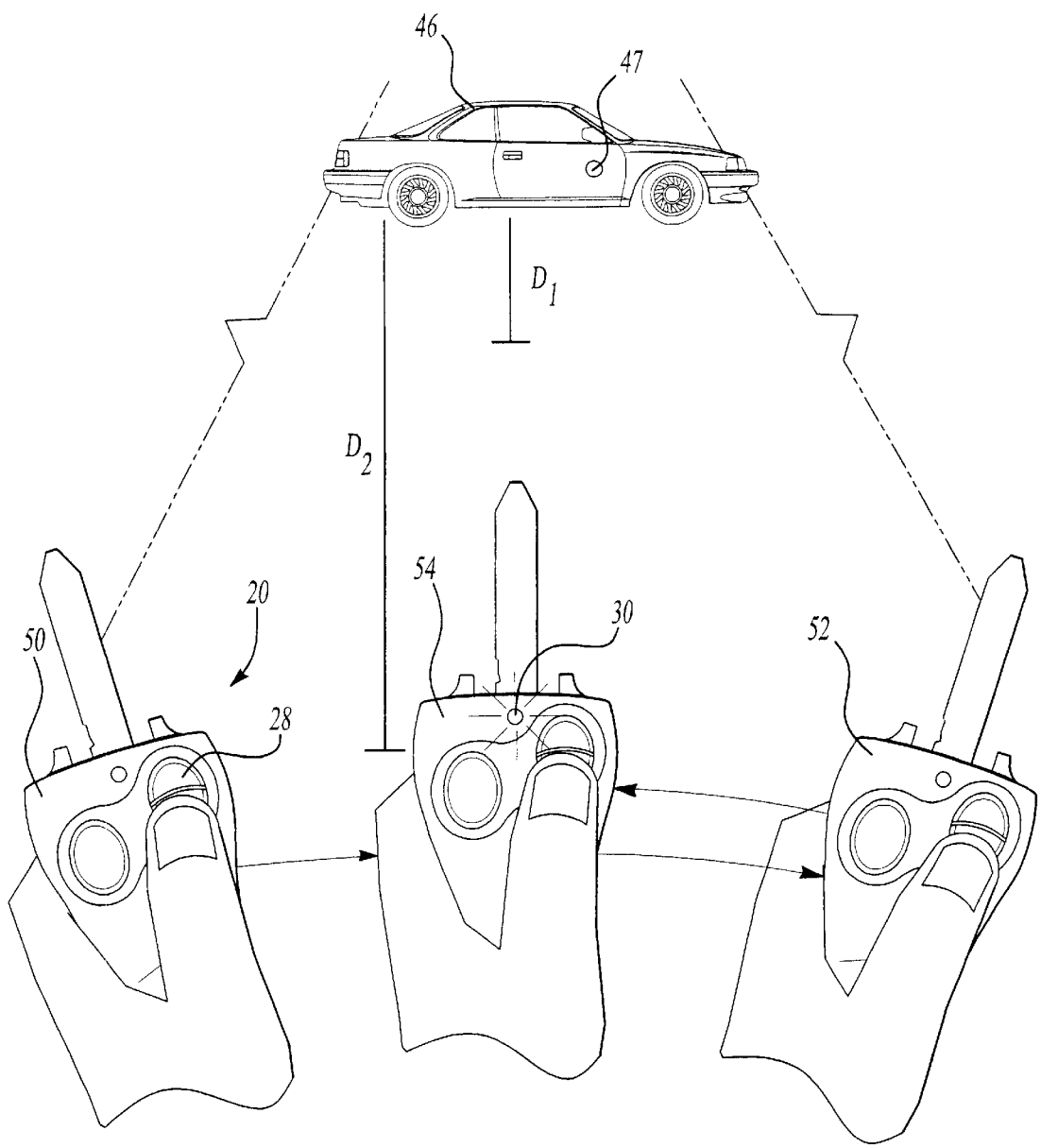
FIG. 6 shows the key fob in a locator mode.

FIG. 6 shows a further feature of this invention, wherein the fob and key 20 is providing a locator function. As shown, the fob and key combination 20 is outside of the distance D1 from a vehicle 46. The vehicle 46 is provided with a transmitter/receiver 47 for transmitting and receiving RF signals. As shown, the fob 20 is a distance D2 from the receiver 47. As known, the fob is typically provided with a transmitter/receiver to send and receive RF signals to and from the transmitter/receiver 47 on the vehicle 46. In the locator mode, one of the switches (here 28) on the fob 24 is actuated. In one embodiment, the door open button 28 is actuated. The fob 22 is moved through an angular range, between points 50 and 52. Through this angular range, at some point, the key fob is pointing directly at the receiver 47.

Receiver 47 receives the RF signal from the fob 24. As is known, the signal sent by the fob is coded in some way and is recognized by the receiver 47 as being associated with the particular vehicle 46. If receiver 47 and associated controls on the vehicle determine that the RF signal is from outside the predetermined distance D1, then the transmitter/receiver 47 moves into the locator mode. In the locator mode, the transmitter 47 sends an RF signal outwardly for a predetermined period of time. During this predetermined period of time, the key fob 20 is moved through the angular movement between points 50 and 52. During this movement the control 40 will be receiving the RF signal from the receiver 47, and looking for a peak on that signal. Once the particular angular movement has been completed, the operator may reverse the direction and move the key fob back through the same angular direction. The control 40 again reads the signal from the transmitter 47. When the same peak is read, the light 30 is actuated such as shown at point 54. Alternatively, sound or vibration actuation may be utilized. However, when the operator sees the signal 30, the operator knows that the key is pointing in the direction of the vehicle. Thus, the operator can begin heading in the proper direction for finding the vehicle.

As an alternative, once the vehicle 46 recognizes that it is in locator mode, it can sense the strength of the signal during a sweep through the angular movement between points 50 and 52. When it next sees the peak, it can assume the fob is then pointed in the direction of the vehicle. A signal can then be sent to the fob indicating to the fob that the vehicle is in that direction.

While the locator function is shown being incorporated into a key fob, it should be understood that other hand held devices could be utilized to perform this method. Thus, hand held telephones, or even stand alone locators could be developed utilizing the above discussed techniques.

Although a preferred embodiment of this invention has been disclosed, a worker in this art would recognize that certain modifications would come within the scope of this invention. For that reason, the following claims should be studied to determine the true scope and content of this invention.

What is claimed is:

1. A hand held vehicle locating system comprising:
    a transmitter/receiver on a hand held device, including switches for activation of security systems on a vehicle, said transmitter/receiver having an identification code which will be recognized by a vehicle associated with said transmitter, said transmitter being operable to send a signal to a receiver on a vehicle, and to receive a signal back from the vehicle, and said hand held device being operable to provide an indication of an approximate direction in which the vehicle is located relative to said hand held device.

2. A system as recited in claim 1, wherein a transmitter on one of a vehicle and said hand held device sends a signal to the other, and said hand held device being moved through an angular range, and a peak on signals received at said receiver is sensed while being moved through said range, and an indication being provided to an operator of the direction of the vehicle by sensing where the peak in said received signal occurs.

3. A system as recited in claim 2, wherein said locator is moved through said angular range once to determine what the peak signal is, and then is moved back through said range until the control again senses a peak, at which time a signal is actuated.

4. A system as recited in claim 1, wherein said locator is in a key fob structure.

5. A system as recited in claim 1, wherein said indication is provided by a light.

6. A vehicle locator and vehicle combination comprising:
a vehicle receiver and transmitter located on a vehicle;
a locator receiver and transmitter located in a locator device, said locator device further including switches for activation of security systems on said vehicle;
said locator device being operable to send a signal to said vehicle receiver that said locator is in a locator mode, said locator receiver being operable to determine an approximate direction to said vehicle based upon said received signal.

7. A combination as set forth in claim 6, wherein said locator receiver being operable to receive a signal from a vehicle, and to determine a peak in said signal to determine said approximate direction.

8. A combination as recited in claim 7, wherein said vehicle receiver is operable to determine a distance from said locator, and to determine that said locator is in a first mode of operation if said distance is less than a predetermined distance, and to determine that said locator is in a locator mode if said distance is greater than said predetermined distance.

9. A combination as recited in claim 8, wherein said locator is included in a key fob having controls for operating and controlling components on said vehicle.

10. A combination as recited in claim 8, wherein said first mode of operation is a door request to said vehicle.

* * * * *